United States Patent

Ioannou

(10) Patent No.: US 9,858,289 B2
(45) Date of Patent: Jan. 2, 2018

(54) STORAGE CONTROLLER AND METHOD FOR MANAGING A SOLID-STATE MEMORY

(71) Applicant: International Business Machines Corporation, Armonk, NY (US)

(72) Inventor: Nikolas Ioannou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/933,770

(22) Filed: Nov. 5, 2015

(65) Prior Publication Data

US 2017/0132245 A1     May 11, 2017

(51) Int. Cl.
  G06F 12/10      (2016.01)
  G06F 17/30      (2006.01)
  G06F 12/1009    (2016.01)
  G06F 12/02      (2006.01)

(52) U.S. Cl.
  CPC .... *G06F 17/30174* (2013.01); *G06F 12/0238* (2013.01); *G06F 12/1009* (2013.01); *G06F 17/30218* (2013.01)

(58) Field of Classification Search
  CPC ............ G06F 12/1009; G06F 12/0238; G06F 17/30174
  USPC ....................................................... 711/103
  See application file for complete search history.

(56) References Cited

U.S. PATENT DOCUMENTS

| | | | |
|---|---|---|---|
| 8,504,791 B2 | 8/2013 | Cheriton et al. | |
| 8,688,899 B2* | 4/2014 | Nellans | G06F 12/0246 |
| | | | 711/103 |
| 8,880,788 B1 | 11/2014 | Sundaram et al. | |
| 9,092,337 B2* | 7/2015 | Nellans | G06F 12/0804 |
| 9,159,419 B2* | 10/2015 | Nellans | G06F 12/0246 |
| 2013/0346725 A1* | 12/2013 | Lomet | G06F 12/10 |
| | | | 711/206 |

\* cited by examiner

*Primary Examiner* — Than Nguyen
(74) *Attorney, Agent, or Firm* — Daniel P. Morris, Esq.; Otterstedt, Ellenbogen & Kammer, LLP (57) ABSTRACT

A storage controller for managing a solid-state memory is suggested. The solid-state memory includes a plurality of physical addresses. The storage controller comprises a mapping table for mapping a plurality of logical addresses to the plurality of physical addresses, the mapping table including mapping values, each mapping value defining the mapping of one logical address to one physical address, a processing unit for performing linearizable operations on the mapping values, the processing unit configured to concurrently execute some of the linearizable operations, a synchronization unit for mediating the concurrently executed linearizable operations, the synchronization unit configured to examine a mapping value of the mapping table, compare the examined mapping value with a known mapping value, the known mapping value being the last known value for the examined mapping value, and, if the examined mapping value and the known mapping value are identical, update the examined mapping value with a new mapping value.

19 Claims, 7 Drawing Sheets

STORAGE CONTROLLER AND METHOD FOR MANAGING A SOLID-STATE MEMORY

BACKGROUND

The invention relates generally to the electrical, electronic and computer arts, and more particularly relates to a storage controller and method for managing a solid-state memory.

In NAND flash-based solid-state disks (SSDs), data is organized in pages of typically 4, 8, or 16 KB sizes. Page read operations are typically one order of magnitude faster than write operations and latency neither depends on the current nor the previous location of operations. However, memory locations must be erased prior to writing to them. The size of an erase block unit is typically 256 pages and the erase operations takes approximately one order of magnitude more time than a page program operation. Due to these intrinsic properties of the NAND flash technology, SSDs have to write data out-of-place, requiring SSDs to maintain a mapping table that maps logical addresses (e.g., logical block addressing (LBA)) to physical addresses (e.g., physical block addressing (PBA)) called logical-to-physical table (LPT).

As flash chips, blocks and/or pages might expose errors or completely fail due to limited endurance or other reasons, additional redundancy has to be used within flash pages, for example using error correction codes (ECC) and the like, such as Bose-Chaudhuri-Hocquenghem Codes (BCH), as well as across flash chips, for example redundant array of independent disks (RAID)-5 or RAID-6 schemes, or similar. While the addition of ECC in pages is straightforward, the organization of flash blocks into RAID-like stripes is more complex because individual blocks have to be retired over time requiring either reorganizing the stripes or shrinking the capacity of the stripe. As the organization of stripes together with the LPT define the placement of data, SSDs can utilize a so-called log-structured array (LSA) architecture which combines these two methods.

With out-of-place writes, a write operation will write new data to a new location in flash, update the mapping information, effectively invalidating data at the old location. The invalidated data location cannot be reused until the entire block it belongs to has been erased. Before erasing, though, the block has to get garbage-collected, which means, any valid data in the block needs to be relocated to a new block. Garbage collection (GC) of a block is typically deferred for as long as possible to reduce the number of valid pages that must be relocated. Pages that have to be relocated cause additional write operations. The additional write operations constitute write amplification. Since NAND flash has limited endurance, i.e., each cell can only endure a limited number of program and erase cycles, achieving a low write amplification is an important objective. In fact, with shrinking technology nodes in NAND flash, endurance is decreasing dramatically, hence making any sort of write reduction or write elimination even more noticeable.

Garbage collection in the context of flash SSD controllers refers broadly to the process of identifying blocks of pages or block-stripes depending on the specific controller and the respective GC unit of operation to be reclaimed for future usage and relocating all remaining valid pages therein. In the following, such a GC unit of operation is referred to as logical erase block (LEB). Note that an LEB may be any multiple of the physical flash block, which is the unit of physical erasure. For instance, in a RAID scheme multiple flash blocks may be grouped together in a block stripe: since the RAID parity is computed against the data in all the participating blocks, these blocks cannot be reclaimed individually. Rather, the full stripe has to be garbage-collected as a single unit. Garbage collecting an LEB entails relocation of any valid logical pages within an LEB to new physical pages to allow for erasing the entire LEB and subsequently make it ready to be populated with new logical pages. The amount of data relocated due to GC relocation of valid pages constitutes garbage collection induced write amplification.

Storage systems based on flash technology are described, for example, in U.S. Patent Application Publication No. 2013/0346725 and U.S. Pat. Nos. 8,880,788 and 8,504,791, the disclosures of which are incorporated by reference herein.

SUMMARY

In accordance with a first aspect, a storage controller for managing a solid-state memory is provided. The solid-state memory includes a plurality of physical addresses. The storage controller comprises a mapping table for mapping a plurality of logical addresses to the plurality of physical addresses, the mapping table including mapping values, each mapping value defining the mapping of one logical address to one physical address. The storage controller further includes a processing unit for performing linearizable operations on the mapping values, the processing unit configured to concurrently execute at least some of the linearizable operations, and a synchronization unit for mediating the concurrently executed linearizable operations, the synchronization unit configured to examine a mapping value of the mapping table, to compare the examined mapping value with a known mapping value, the known mapping value being the last known value for the examined mapping value, and, if the examined mapping value and the known mapping value are identical, to update the examined mapping value with a new mapping value.

Optionally, in one or more embodiments, when the processing unit performs a read request, the synchronization unit is configured to determine a logical address of the read request, to determine a corresponding physical address from the mapping table, and to determine whether the corresponding physical address is valid.

Optionally, in one or more embodiments, when the corresponding physical address is valid, the processing unit is configured to perform the read request by reading the data of the physical address into a buffer. When the corresponding physical address is invalid, the processing unit may be configured to perform the read request by filling a buffer with zero bits, in one or more embodiments.

Optionally, in one or more embodiments, when the processing unit performs an aligned write (or, equivalently, a full page write) request to a logical address, the processing unit is configured to acquire an available physical address and to write data to the acquired physical address, and wherein the synchronization unit is configured to determine a mapping value corresponding to the logical address of the write request as known mapping value, to determine the current physical address from the known mapping value, and to update the current physical address with the acquired physical address.

Optionally, according to one or more embodiments, the synchronization unit is configured to determine whether the update was successful by examining a mapping value corresponding to the logical address, to compare the examined mapping value and the known mapping value and to decide that the update was successful if the examined mapping value and the known mapping value are identical.

According to a second aspect, a method for managing a solid-state memory is provided, the solid-state memory including a plurality of physical addresses. The method includes the steps of: mapping logical addresses to the plurality of physical addresses and storing the mapping in a mapping table, the mapping table including mapping values, each mapping value defining the mapping of one logical address to one physical address; concurrently executing at least some linearizable operations on the mapping values, the linearizable operations including at least read and write operations; and mediating the concurrently executed linearizable operations by examining a mapping value of the mapping table, comparing the examined mapping value to a given mapping value, the given mapping value being the last known value for the examined mapping value, and, if the examined mapping value and the given mapping value are identical, updating the examined mapping value with a new mapping value.

According to a third aspect, the invention relates to a computer program comprising a program code for executing at least one step of the method of the second aspect for managing a solid-state memory when run on at least one computer.

Embodiments of the invention will be described in more detail below, by way of illustrative and non-limiting example, with reference to the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative a storage controller for managing a solid-state memory and methods for implementing same. It is to be appreciated, however, that the invention is not limited to the specific apparatus and/or methods illustratively shown and described herein. Rather, it will become apparent to those skilled in the art given the teachings herein that numerous modifications can be made to the embodiments shown that are within the scope of the claimed invention. That is, no limitations with respect to the embodiments shown and described herein are intended or should be inferred.

Figure 1:
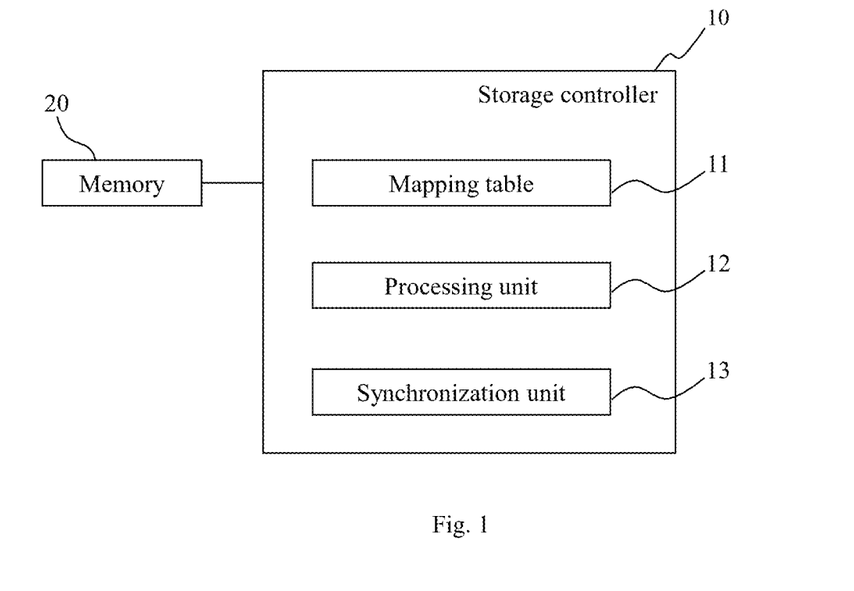
FIG. 1 shows an exemplary storage controller configured for managing a solid-state memory, according to an embodiment of the invention.

FIG. 1 shows an exemplary storage controller 10 configured for managing a solid-state memory 20, according to an embodiment of the invention. The solid-state memory 20 includes a plurality of physical block addresses PBAs, to which logical block addresses LBAs can be mapped. The physical block addresses are herein equivalently referred to as physical addresses, the logical block addresses are herein equivalently referred to as logical addresses.

Figure 3:
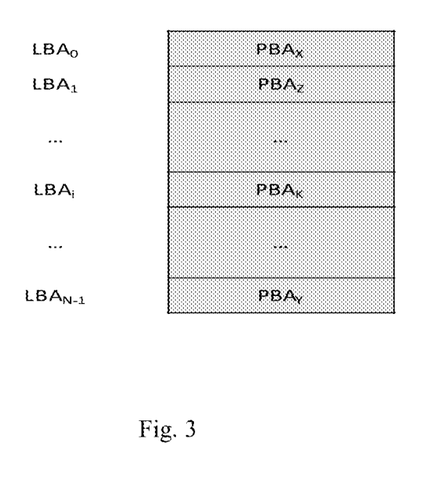
FIG. 3 shows an exemplary mapping table of the storage controller of FIG. 1, according to an embodiment of the invention.

The storage controller 10 comprises a mapping table 11 for mapping a plurality of logical addresses LBAs to the plurality of physical addresses PBAs. An example of such a mapping table 11 is shown in FIG. 3. The mapping table 11 includes mapping values, each mapping value defining the mapping of one logical address LBA to one physical address PBA.

A processing unit 12 of the storage controller 10 is configured to perform linearizable operations on the mapping values. The processing unit 12 can execute some of the linearizable operations concurrently.

The storage controller 10 further comprises a synchronization unit 13 for mediating the concurrently executed linearizable operations. The synchronization unit 13 is configured to examine a mapping value of the mapping table 11, compare the examined mapping value with a known mapping value, the known mapping value being the last known value for the examined mapping value, and, if the examined mapping value and the known mapping value are identical, update the examined mapping value with a new mapping value.

The storage controller 10 is a thread-safe lock-free software LSA storage controller optimized for flash. Any LSA controller keeps its mappings on logical page granularity, e.g., 4KiB, but accepts I/O that could be smaller than that, typically a sector, e.g. 512B. If the I/O granularity supported is smaller than the mapping granularity, then any write I/O can be distinguished based on whether it is aligned and an integer multiple of the logical page size (write-aligned) or not (write-unaligned). In this context, the term LBA refers to a unique logical page, and the term PBA refers to a unique physical page location that is of equal size to the logical page. An aligned write operation refers to a full-page update operation and an unaligned write operation refers to a partial-page update operation.

The storage controller 10 provides the following advantages. It provides a lock-free method for managing the operations associated with a flash controller, i.e. write, read and relocate. The term "lock-free" as used herein is intended to broadly mean that the pages (or blocks or addresses) of the memory need not be locked when one user or device performs any operations, as it will be checked by the synchronization unit 13 if the operations can be finished or not. For example, if another user writes at the same time to the same logical address, the synchronization unit 13 is able to detect that there is a race condition (two or more operations to the same address at the same time), by comparing a known mapping value and a currently examined mapping value, and the operation not allow to be finished if the known mapping has changed; the required linearization is achieved by detecting the failed update and re-trying the operation in a lock-free manner.

Further, the storage controller 10 provides a separation between aligned (full page) and unaligned (partial page) updates and benefits by guaranteeing no re-try for aligned updates. This will be described in the following in greater detail. If writes span multiple pages, i.e. physical addresses, the writes are handled page by page and any failed page update will only incur a retry of that page alone, even if part of a bigger request.

The respective unit or entity, e.g. the processing unit or the synchronization unit, may be implemented in hardware and/or in software. If said unit is implemented in hardware, it may be embodied as a device, e.g. as a processor or as a part of a system, e.g. a computer system. If said unit is implemented in software it may be embodied as a computer program product, as a function, as a routine, as a program code or as an executable object.

Figure 2:
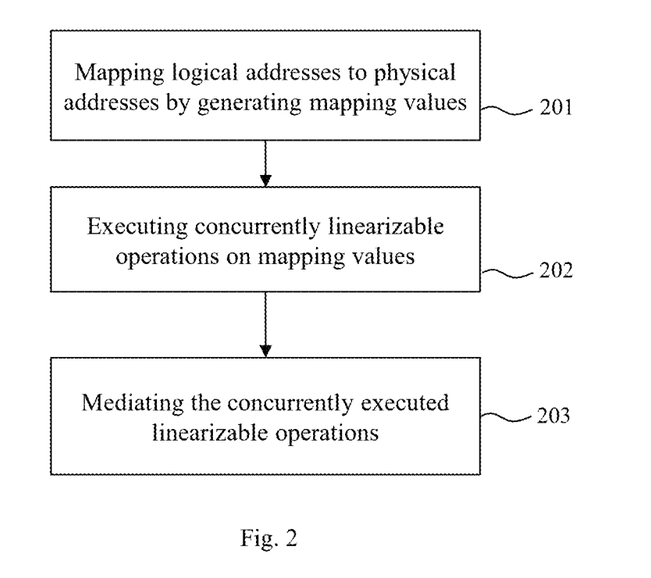
FIG. 2 shows a sequence of steps in an exemplary method for managing a solid-state memory, according to an embodiment of the invention.

FIG. 2 shows a sequence of steps in an exemplary method for managing a solid-state memory, according to an embodiment of the invention. The method of FIG. 2 has the following steps 201-203.

In a first step 201, logical addresses (LBAs) are mapped to physical addresses (PBAs) and the mapping is stored in a mapping table. The mapping table includes mapping values, each mapping value defining the mapping of one logical address LBA to one physical address PBA.

In a second step 202, some linearizable operations are concurrently executed on the mapping values, the linearizable operations including at least read and write operations.

In a third step 203, the concurrently executed linearizable operations are mediated by examining a mapping value of the mapping table, comparing the examined mapping value to a given mapping value, the given mapping value being the last known value for the examined mapping value, and, if the examined mapping value and the given mapping value are identical, updating the examined mapping value with a new mapping value.

FIG. 3 shows an exemplary mapping table 11 of the storage controller of FIG. 1, according to an embodiment of the invention. The mapping table 11, in this illustrative embodiment, is an in-memory directly-mapped LPT with one entry per logical address (LBA) that uniquely maps an LBA to a physical address (PBA) and is memory aligned. For garbage collection, a means to retrieve a PBA-to-LBA back-pointer at the time of the PBA write is assumed. This is typical in flash storage controllers and can be achieved either by embedding the back-pointer together with the data, storing it in an in-memory table, or a combination of both.

Figure 4:
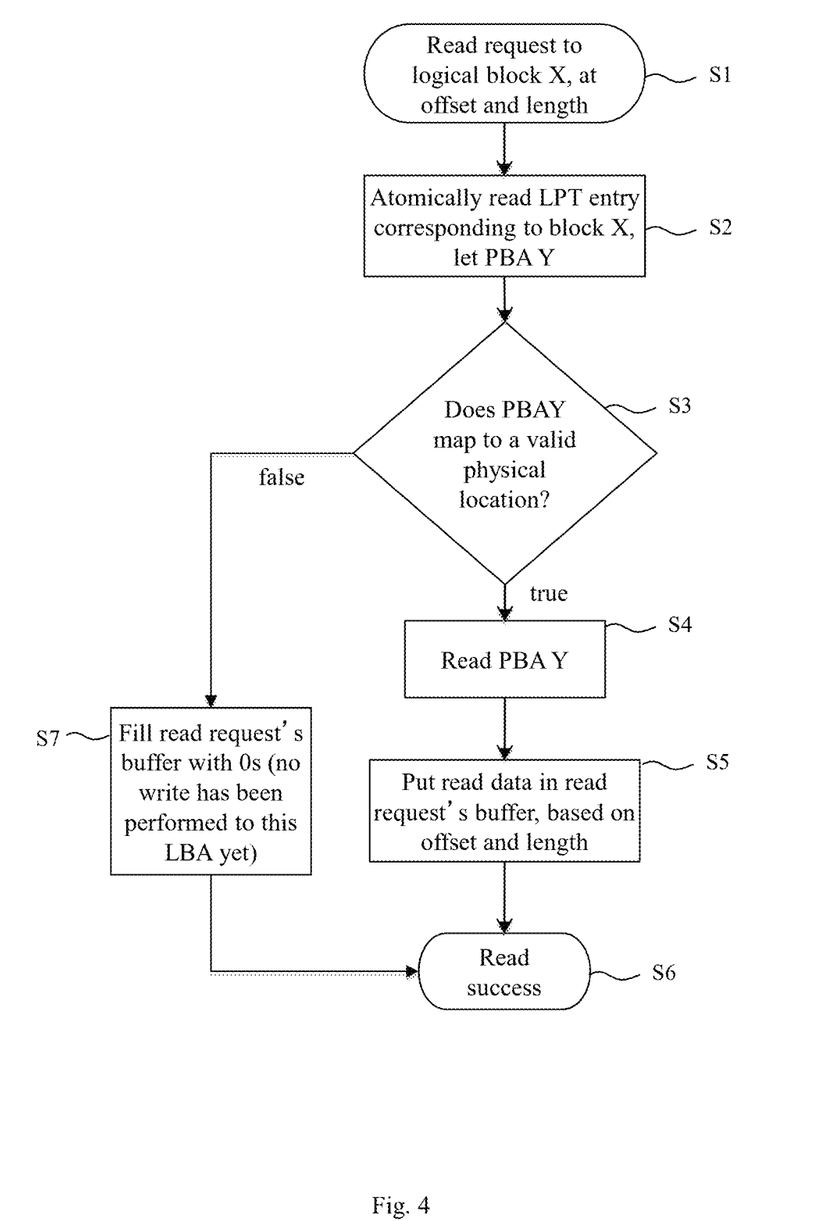
FIG. 4 shows a sequence of steps in an exemplary method for managing a solid-state memory during a read request, according to an embodiment of the invention.
Figure 5:
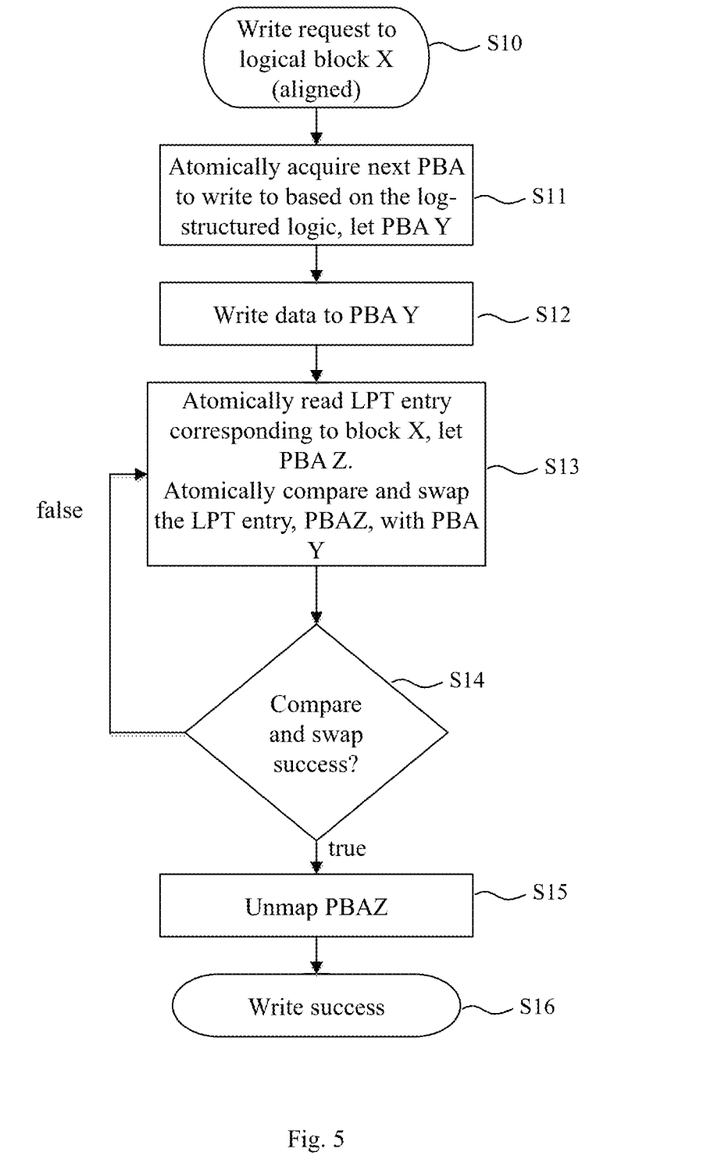
FIG. 5 shows a sequence of method steps in an exemplary method for managing a solid-state memory during an aligned (full page) write request, according to an embodiment of the invention.
Figure 6:
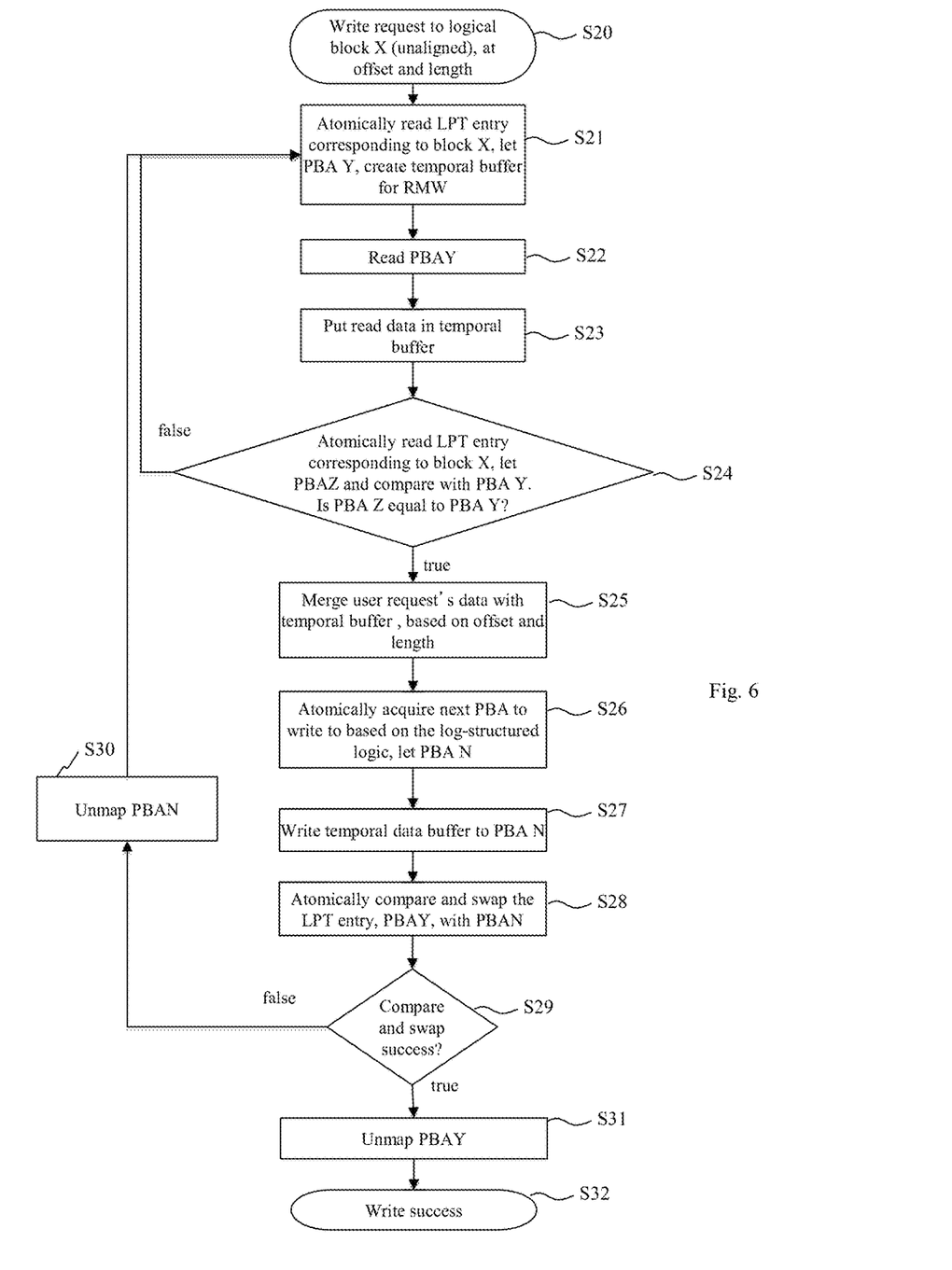
FIG. 6 shows a sequence of method steps in an exemplary method for managing a solid-state memory during an unaligned write (partial page update) request, according to an embodiment of the invention.
Figure 7:
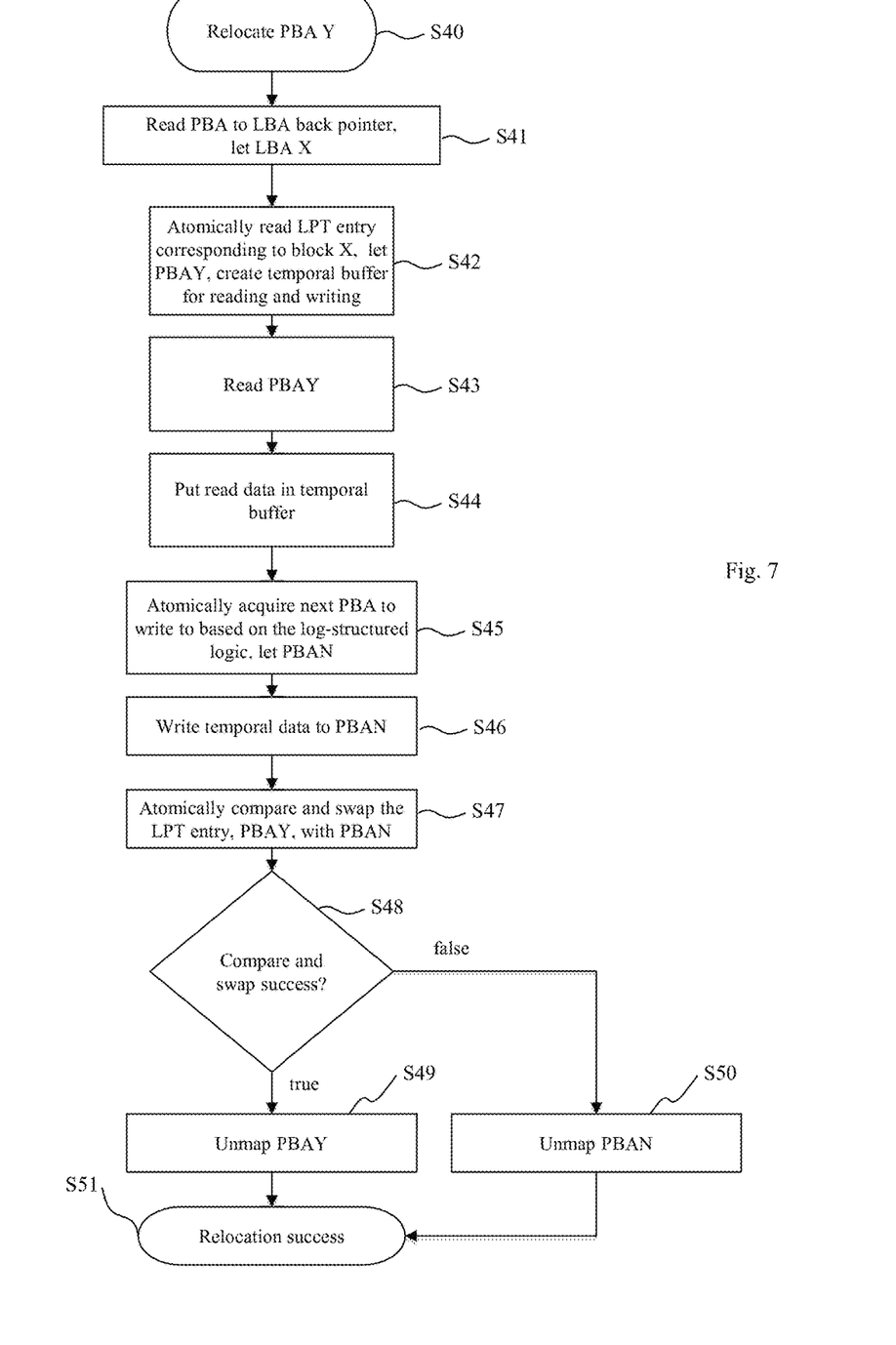
FIG. 7 shows a sequence of method steps in an exemplary method for managing a solid-state memory during a relocate request, according to an embodiment of the invention.

By way of example only and without limitation, several operations performable by the storage controller 10 will be described with reference to FIGS. 4 to 7. Specifically, FIG. 4 shows a sequence of steps in an exemplary method for managing a solid-state memory during a read request, according to an embodiment of the invention. FIG. 5 shows a sequence of method steps in an exemplary method for managing a solid-state memory during an aligned (full page) write request, according to an embodiment of the invention. FIG. 6 shows a sequence of method steps in an exemplary method for managing a solid-state memory during an unaligned write (partial page update) request, according to an embodiment of the invention. FIG. 7 shows a sequence of method steps in an exemplary method for managing a solid-state memory during a relocate request, according to an embodiment of the invention.

With reference to FIG. 4, steps S1 to S7 of a read request are shown.

In step S1, a read request to logical block X is initiated. The logical block X is defined by an offset and length, wherein the offset corresponds to the LBA of the mapping table 11, also called LPT in the following.

In step S2, a mapping table entry corresponding to block X is read atomically. The entry or mapping value is PBA Y in this illustration.

In step S3, it is determined whether PBA Y maps to a valid physical location. If this is true, the mapping value PBA Y is read in step S4, which means that the content of PBA Y is read.

In step S5, the read data is put in a buffer, called the read request's buffer, based on the corresponding offset and length.

In step S6, the read was successful and the operation is finished.

If the determination in step S3 was false, the read request's buffer is filled with 0's in step S7, as no write has been performed to the logical block X at this time (logical block X was thus uninitialized at the time of the request). Then, the operation is finished in step S6.

With reference now to FIG. 5, an aligned write request (i.e., a write request which relates to a whole block or page of the memory 20) is shown.

In step S10, the write request to logical block X is initiated.

In step S11, the next PBA to write to is atomically acquired. This is done based on the underlying log-structured logic. The next available PBA is PBA Y. In step S12, data is written to this PBA Y.

In step S12, the mapping value or mapping table entry corresponding to block X is atomically read. This will be PBA Z. PBA Z is the current entry for logical block X which needs to be swapped with PBA Y, the new PBA for logical block X. Further in step S12, the mapping value PBA Z will be compared and then swapped with PBA Y. For this, the mapping value PBA Z will be examined and compared with the previous mapping value PBA Z, i.e. the last known mapping value. Only if the mapping value is still identical, the compare and swap is successful as will be determined in step S14.

If the swap and compare operation was successful, PBA Z will be unmapped in step S15, i.e. be released for further operations, and the write is successful and will be finished in step S16.

If the swap and compare operation was not successful, step S13 will be repeated.

With reference now to FIG. 6, an unaligned write operation (i.e., a write operation which relates only to a partial block or page) is shown. This can also be called partial update.

In step S20, the write request to logical block X is initiated.

In step S21, the mapping value or LPT entry corresponding to block X is atomically read. This is PBA Y. A temporal buffer is created for the read-modify-write (RMW) operation necessary for the partial update.

In step S22, the content of PBA Y is read and the read data is put in the temporal buffer at step S23.

In step S24, the mapping value corresponding to logical block X is atomically read (here PBA Z) and compared with PBA Y. This step provides an intermediate check and thus an optimization as the following steps can be omitted if there is a failure. However, step S24 can also be omitted.

If PBA Y and PBA Z are not identical, steps S21 to S24 are repeated.

If PBA Y and PBA Z are identical, the user request's data, i.e. the data to be written, and the data of the temporal buffer are merged, based on the request's offset and length (step S20), in step S25.

In step S26, the next PBA to write to is atomically acquired. This is done based on the underlying log-structured logic. The next available PBA is PBA N. In step S27, the merged data is written to this PBA N.

In step S28, the mapping value PBA Y will be compared and then swapped with PBA N. For this, the mapping value PBA Y will be examined and compared with the previous mapping value PBA Y, i.e. the last known mapping value. Only if the mapping value is still identical, the compare and swap is successful as will be determined in step S29.

If the swap and compare operation was successful, PBA Y will be unmapped in step S31, i.e. be released for further operations, and the write is successful and will be finished in step S32.

If the swap and compare operation was not successful, PBA N will be unmapped in step S30 and the steps S21 to S29 will be repeated.

With reference now to FIG. 7, a relocate operation (i.e., an operation for relocating data from one PBA to another PBA) is shown.

In step S40, the relocate operation of PBA Y is initiated.

In step S41, the back-pointer of PBA Y to an LBA is read, the LBA being LBA X, i.e. logical block X.

In step S42, the mapping value or LPT entry corresponding to block X is atomically read. This is PBA Y. A temporal buffer is created for reading and then writing a block.

In step S43, the content of PBA Y is read and the read data is put in the temporal buffer at step S44.

In step S45, the next PBA to write to is atomically acquired. This is done based on the underlying log-structured logic. The next available PBA is PBA N. In step S46, the data from the temporal buffer is written to this PBA N.

In step S47, the mapping value PBA Y will be compared and then swapped with PBA N. For this, the mapping value PBA Y will be examined and compared with the previous mapping value PBA Y, i.e. the last known mapping value. Only if the mapping value is still identical, the compare and swap is successful as will be determined in step S48.

If the swap and compare operation was successful, PBA Y will be unmapped in step S49, i.e. be released for further operations, and the write is successful and will be finished in step S51.

If the swap and compare operation was not successful, PBA N will be unmapped in step S50.

In a controller implementing the above lock-free operations and composed of a garbage collector and LEB erase unit then a special case has to be taken into account before the garbage collector hands over an LEB to be recycled (erased/freed) and subsequently re-used. All outstanding user reads to the LEB to-be-recycled have to finish before the LEB is recycled. Note, that reads to an LEB can happen in parallel with the relocations of said LEB, but the LEB can only be recycled after the reads have quiesced. This can be implemented, in one or more embodiments, with a reference counter per LEB; the read operation increments the reference counter of the LEB and decrements it when the operation finishes. The LEB erase unit waits until an LEB's reference counter reaches zero before erasing it.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by one or more suitable digital processing devices. In further exemplary embodiments, at least one step or all steps of above methods of FIGS. 2 and 4 to 7 may be implemented in software, as an executable program, the latter executed by suitable digital processing devices. More generally, embodiments of the present invention may be implemented wherein general-purpose digital computers, such as personal computers, workstations, etc., are used.

Figure 8:
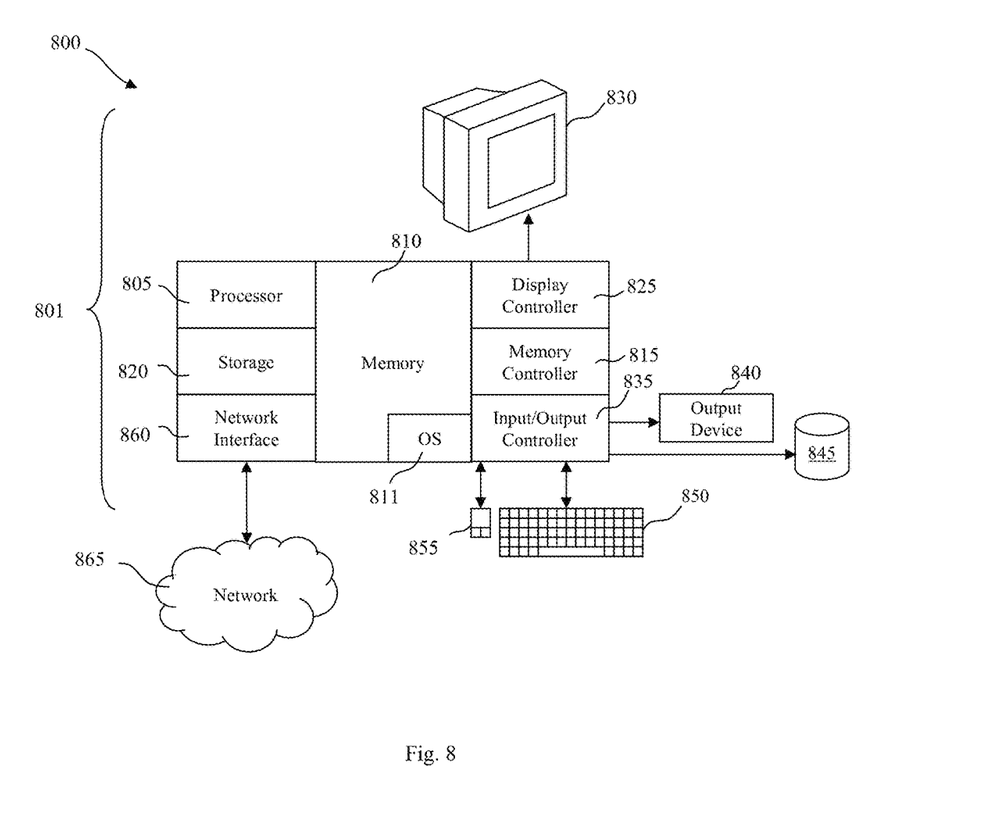
FIG. 8 is a schematic block diagram depicting at least a portion of an exemplary system configured for performing a method for detecting a regular expression within input data, according to an embodiment of the invention.

For instance, the system 800 depicted in FIG. 8 schematically represents a computerized unit 801, e.g., a general-purpose computer, configured to implement method in accordance with embodiments of the invention. In exemplary embodiments, in terms of hardware architecture, as shown in FIG. 8, the unit 801 includes a processor 805, memory 810 coupled to a memory controller 815, and one or more input and/or output (I/O) devices 840, 845, 850, 855 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in memory 810. The processor 805 can be any custom made or commercially available processor, a central processing unit (CPU), an auxiliary processor among several processors associated with the computer 801, a semiconductor based microprocessor (in the form of a microchip or chip set), or generally any device for executing software instructions.

The memory 810 can include any one or combination of volatile memory elements (e.g., random access memory) and nonvolatile memory elements. Moreover, the memory 810 may incorporate electronic, magnetic, optical, and/or other types of storage media. Note that the memory 810 can have a distributed architecture, where various components are situated remote from one another, but nonetheless can be accessed by the processor 805.

The software in memory 810 may include one or more separate programs, each of which comprises an ordered listing of executable instructions for implementing logical functions. In the example of FIG. 8, the software in the memory 810 includes methods described herein in accordance with exemplary embodiments and a suitable operating system (OS) 811. The OS 811 essentially controls the execution of other computer programs, such as the methods as described herein (e.g., FIG. 2), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 810, so as to operate properly in connection with the OS 811. Furthermore, the methods can be written as an object oriented programming language, which has classes of data and methods, or a procedure programming language, which has routines, subroutines, and/or functions.

Possibly, a conventional keyboard 850 and mouse 855 can be coupled to the input/output controller 835 (in particular for the BS, if needed). Other I/O devices 840-855 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 835 for further processing. Sensor nodes are ideally small, consume low energy, are autonomous and operate unattended.

In addition, the I/O devices 840-855 may further include devices that communicate both inputs and outputs. The system 800 can further include a display controller 825 coupled to a display 840. In exemplary embodiments, the system 800 can further include a network interface or transceiver 860 for coupling to a network 865.

The network 865 transmits and receives data between the unit 801 and external systems. The network 865 is possibly implemented in a wireless fashion, e.g., using wireless protocols and technologies, such as WiFi, WiMax, etc. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 865 can also be an IP-based network for communication between the unit 801 and any external server, client and the like via a broadband connection. In exemplary embodiments, network 865 can be a managed IP network administered by a service provider. Besides, the network 865 can be a packet-switched network such as a LAN, WAN, Internet network, etc.

If the unit 801 is a PC, workstation, intelligent device or the like, the software in the memory 810 may further include a basic input output system (BIOS). The BIOS is stored in ROM so that the BIOS can be executed when the computer 801 is activated.

When the unit 801 is in operation, the processor 805 is configured to execute software stored within the memory 810, to communicate data to and from the memory 810, and to generally control operations of the computer 801 pursuant to the software. The methods described herein and the OS 811, in whole or in part are read by the processor 805, typically buffered within the processor 805, and then executed. When the methods described herein are implemented in software, the methods can be stored on any computer readable medium, such as storage 820, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed is:

1. A storage controller for managing a solid-state memory, the solid-state memory including a plurality of physical addresses, the storage controller comprising:
   a mapping table for mapping a plurality of logical addresses to the plurality of physical addresses, the mapping table including mapping values, each mapping value defining the mapping of one logical address to one physical address;
   a processing unit for performing linearizable operations on the mapping values, the processing unit configured to concurrently execute at least some of the linearizable operations; and
   a synchronization unit for mediating the concurrently executed linearizable operations, the synchronization unit configured to examine a mapping value of the mapping table, to compare the examined mapping value with a known mapping value, the known mapping value being the last known value for the examined mapping value, and, when the examined mapping value and the known mapping value are identical, to update the examined mapping value with a new mapping value;
   wherein, when the processing unit performs an unaligned write request to a logical address, the synchronization unit is configured to determine a mapping value corresponding to the logical address of the write request as a known mapping value, to determine the current physical address from the known mapping value and wherein the processing unit is configured to read the data from the current physical address and to store the read data in a buffer.

2. The storage controller of claim 1, wherein the linearizable operations include at least one of a read operation, a write operation and a relocate operation.

3. The storage controller of claim 1, wherein data is stored in the solid-state memory in a log-structured file system.

4. The storage controller of claim 1, wherein, when the processing unit performs a read request, the synchronization unit is configured to determine a logical address of the read request, to determine a corresponding physical address from the mapping table, and to determine whether the corresponding physical address is valid.

5. The storage controller of claim 4, wherein, when the corresponding physical address is valid, the processing unit is configured to perform the read request by reading the data of the physical address into a buffer.

6. The storage controller of claim 4, wherein, when the corresponding physical address is invalid, the processing unit is configured to perform the read request by filling a buffer with zero bits.

7. The storage controller of claim 1, wherein, when the processing unit performs an aligned write request to a logical address, the processing unit is configured to acquire an available physical address and to write data to the acquired physical address, and wherein the synchronization unit is configured to determine a mapping value corresponding to the logical address of the write request as a known mapping value, to determine the current physical address from the known mapping value, and to update the current physical address with the acquired physical address.

8. The storage controller of claim 7, wherein the synchronization unit is configured to determine whether the update was successful by examining a mapping value corresponding to the logical address, to compare the examined mapping value and the known mapping value and to decide that the update was successful when the examined mapping value and the known mapping value are identical.

9. The storage controller of claim 8, wherein the synchronization unit is configured to unmap the current physical address if the update was successful.

10. The storage controller of claim 9, wherein the synchronization unit is configured to determine a mapping value corresponding to the logical address of the write request as an examined mapping value and to compare the known mapping value and the examined mapping value.

11. The storage controller of claim 1, wherein the processing unit is configured to merge the data of the write request with the data stored in the buffer, to acquire an available physical address and to write the merged data to the acquired physical address.

12. The storage controller of claim 11, wherein the synchronization unit is configured to update the mapping value with the acquired physical address.

13. The storage controller of claim 12, wherein the synchronization unit is configured to determine whether the update was successful by examining a mapping value corresponding to the logical address, to compare the examined mapping value and the known mapping value and to decide that the update was successful when the examined mapping value and the known mapping value are identical.

14. The storage controller of claim 13, wherein the synchronization unit is configured to unmap the acquired physical address if the update was not successful and to unmap the current physical address if the update was successful.

15. The storage controller of claim 1, wherein, when the processing unit performs a relocate request of a physical address during a garbage collection operation, the synchronization unit is configured to determine the logical address corresponding to the physical address, to examine the mapping table and to determine a mapping value corresponding to the logical address as the known mapping value, and wherein the processing unit is configured to read the data from the physical address and to store the read data in a buffer.

16. The storage controller of claim 15, wherein the processing unit is configured to acquire an available physical address and to write the read data to the acquired physical address, and wherein the synchronization unit is configured to update the mapping value with the acquired physical address.

17. A storage controller for managing a solid-state memory, the solid-state memory including a plurality of physical addresses, the storage controller comprising:
a mapping table for mapping a plurality of logical addresses to the plurality of physical addresses, the mapping table including mapping values, each mapping value defining the mapping of one logical address to one physical address;
a processing unit for performing linearizable operations on the mapping values, the processing unit configured to concurrently execute at least some of the linearizable operations; and
a synchronization unit for mediating the concurrently executed linearizable operations, the synchronization unit configured to examine a mapping value of the mapping table, to compare the examined mapping value with a known mapping value, the known mapping value being the last known value for the examined mapping value, and, when the examined mapping value and the known mapping value are identical, to update the examined mapping value with a new mapping value;
wherein the processing unit is configured to acquire an available physical address and to write the read data to the acquired physical address, and wherein the synchronization unit is configured to update the mapping value with the acquired physical address; and
wherein the synchronization unit is configured to determine whether the update was successful by examining a mapping value corresponding to the logical address, to compare the examined mapping value and the known mapping value and to decide that the update was successful when the examined mapping value and the known mapping value are identical.

18. The storage controller of claim 17, wherein the synchronization unit is configured to unmap the acquired physical address if the update was not successful and to unmap the current physical address if the update was successful.

19. A method for managing a solid-state memory, the solid-state memory including a plurality of physical addresses, the method comprising:
mapping logical addresses to the plurality of physical addresses and storing the mapping in a mapping table, the mapping table including mapping values, each mapping value defining the mapping of one logical address to one physical address;
concurrently executing at least some linearizable operations on the mapping values, the linearizable operations including at least read and write operations;
mediating the concurrently executed linearizable operations by examining a mapping value of the mapping table, comparing the examined mapping value to a given mapping value, the given mapping value being the last known value for the examined mapping value, and, when the examined mapping value and the given mapping value are identical, updating the examined mapping value with a new mapping value; and
when performing an unaligned write request to a logical address, determining a mapping value corresponding to the logical address of the write request as a known mapping value, determining the current physical address from the known mapping value, and reading the data from the current physical address and storing the read data in a buffer.

* * * * *